United States Patent
Velthaus et al.

(10) Patent No.: US 9,829,765 B2
(45) Date of Patent: Nov. 28, 2017

(54) ELECTRO-OPTICAL MODULATOR

(71) Applicant: FRAUNHOFER-GESELLSCHAFT ZUR FÖRDERUNG DER ANGEWANDTEN FORSCHUNG E.V., München (DE)

(72) Inventors: Karl-Otto Velthaus, Kleinmachnow (DE); Marko Rausch, Berlin (DE)

(73) Assignee: FRAUNHOFER-GESELLSCHAFT ZUR FÖRDERUNG DER ANGEWANDTEN FORSCHUNG E.V., München (DE)

( * ) Notice: Subject to any disclaimer, the term of this patent is extended or adjusted under 35 U.S.C. 154(b) by 0 days.

(21) Appl. No.: 15/039,406

(22) PCT Filed: Nov. 25, 2014

(86) PCT No.: PCT/EP2014/075528
§ 371 (c)(1),
(2) Date: May 25, 2016

(87) PCT Pub. No.: WO2015/075260
PCT Pub. Date: May 28, 2015

(65) Prior Publication Data
US 2016/0349595 A1 Dec. 1, 2016

(30) Foreign Application Priority Data
Nov. 25, 2013 (EP) ..................................... 13194250

(51) Int. Cl.
*G02F 1/035* (2006.01)
*G02F 1/225* (2006.01)
*G02F 1/21* (2006.01)

(52) U.S. Cl.
CPC .......... *G02F 1/2255* (2013.01); *G02F 1/2257* (2013.01); *G02F 2001/212* (2013.01); *G02F 2201/127* (2013.01)

(58) Field of Classification Search
CPC ............................. G02F 1/2255; G02F 1/2257
(Continued)

(56) References Cited

U.S. PATENT DOCUMENTS

2003/0103709 A1 6/2003 Grinberg et al.
2011/0170210 A1* 7/2011 Helvajian ............... G02F 1/011
359/896
(Continued)

FOREIGN PATENT DOCUMENTS

EP 2 615 489 A1 7/2013
EP 2 615 490 A1 7/2013
(Continued)

OTHER PUBLICATIONS

Bogatin, E., "Differential Impedance . . . finally made simple," Training for Signal Integrity and Interconnect Design, 2000, pp. 1-25.
(Continued)

*Primary Examiner* — Jerry Blevins
(74) *Attorney, Agent, or Firm* — Maschoff Brennan

(57) ABSTRACT

An electro-optical modulator is provided. The electro-optical modulator comprises at least one optical waveguide, an electrode arrangement for applying a voltage across the optical waveguide. The electrode arrangement comprises a first and a second electrical line and at least two terminating resistors terminating the first and the second electrical line. The electrode arrangement comprises at least one capacitive structure that capacitively couples, but galvanically separates the two terminating resistors. The capacitive structure comprises at least two electrically conductive layers physi- (Continued)

cally arranged at a position between the first and the second electrical line, wherein the at least two layers are separated by at least one dielectric layer.

15 Claims, 6 Drawing Sheets

(58) Field of Classification Search
USPC .................................................. 385/3
See application file for complete search history.

(56) References Cited

U.S. PATENT DOCUMENTS

2012/0087614 A1* 4/2012 Ishimura ............... G02F 1/025
 385/2
2013/0209023 A1* 8/2013 Prosyk ................. G02F 1/011
 385/3

FOREIGN PATENT DOCUMENTS

| JP | 2002-333604 | A | | 11/2002 | |
|---|---|---|---|---|---|
| JP | 2002333604 | A | * | 11/2002 | ............ G02F 1/035 |
| JP | 2010-211060 | A | | 9/2010 | |
| WO | 2012/175551 | A1 | | 12/2012 | |
| WO | 2013/096750 | A1 | | 6/2013 | |

OTHER PUBLICATIONS

Hoffmann, D., et al., "45 GHZ Bandwith Travelling Wave Electrode Mach-zehnder Modulator with Integrated Spot Size Converter," Proceedings International Conference on Indium Phosphide and Related Materials, 2004, pp. 585-588.
Simons, R.N., et al., "Modeling of coplanar stripline discontinuities," IEEE Transactions on Microwave Theory and Techniques, vol. 44, Issue 5, May 1996, pp. 711-716.
Walker, R. G., et al., "High-Speed III-V Semiconductor Intensity Modulators," IEEE Journal of Quantum Electronics, vol. 27, Issue 3, Mar. 1991, pp. 654-667.

* cited by examiner

ELECTRO-OPTICAL MODULATOR

CROSS-REFERENCE TO A RELATED APPLICATION

This application is a National Phase Patent Application of International Patent Application Number PCT/EP2014/075528, filed on Nov. 25, 2014, which claims priority of European Patent Application Number 13194250.0, filed on Nov. 25, 2013.

BACKGROUND

The invention relates to an electro-optical modulator.

Such electro-optical modulators comprise, for example, a high frequency electrode arrangement used for supplying a voltage across optical waveguides of the modulators for creating a phase shift of the optical waves propagating in the waveguides. For example, travelling wave electrodes are used for supplying a voltage to the optical modulator waveguides as disclosed in the publication "High-Speed III-V Semiconductor Intensity Modulators", Robert G. Walker, IEEE Journal of Quantum Electronics Vol. 27, No. 3, March 1991. These known modulators, however, tend be rather large if pre-determined electrical power losses shall not be exceeded.

SUMMARY

It is an object of the invention to provide a compact electro-optical modulator capable of low-loss operation.

According to the invention, an electro-optical modulator is provided, comprising
at least one optical waveguide;
an electrode arrangement for applying a voltage across the optical waveguide,
wherein the electrode arrangement comprises a first and a second electrical line and at least two terminating resistors terminating the first and the second electrical line; and
wherein the electrode arrangement comprises at least one capacitive structure that capacitively couples, but galvanically separates the two terminating resistors, wherein
the capacitive structure comprises at least two electrically conductive layers physically arranged at a location between the first and the second electrical line, wherein the two layers are separated by a dielectric layer.

The design of the capacitive structure in particular permits a rather compact layout of the electro-optical modulator and at the same time allows the modulator to be driven by a driver unit (i.e. an amplifier) in open collector configuration to keep power losses low. More particularly, the driver unit (e.g. a driver chip), the first and second electrical line, the terminating resistors and the (blocking) capacitive structure of the modulator (and e.g. also the employed assembly and joining technology) can be regarded as integral components of the open collector circuitry (e.g. a high frequency open collector circuitry) as will be explained in more detail below. In particular, an immersive electrical design of the driver unit and the electrical lines and the terminating network (comprising the terminating resistors and the capacitive structure) of the modulator will be carried out in particular to adapt the overall impedance of these components and thus to optimize the performance of the modulator.

For example, modulator devices (i.e. the combination of the driver unit and the modulator), employed e.g. for long-distance applications, having power losses smaller than 400 mW may be realized. Further, because of the possible low power consumption and the possible compact design of the modulator, compact high frequency modulator modules (having e.g. a transmission rate of at least 100 Gbit/s) can be fabricated (e.g. in the CFP4 size). Further, the galvanic separation of the terminating resistors by means of the capacitive structure permits to apply different (DC) bias voltages to the first and the second electrical line, respectively.

For example, the capacitive structure and the first and second electrical line of the electrode arrangement are arranged on a common substrate, i.e. the capacitive structure and the electrical lines are monolithically integrated. Also, the terminating resistors and the first and second electrical line may be arranged on a common substrate, wherein, in particular, the capacitive structure, the terminating resistors and the electrical lines are monolithically integrated, i.e. these components are arranged on the same substrate and e.g. are fabricated using the same semiconductor technology. The terminating resistors each may be formed by a material layer (i.e. as a planar structure) or a plurality of material layers, which may result in an enhanced scalability of the terminating resistors.

Because of the monolithic integration of these components, bond connections between the terminating resistors and/or the capacitive structure and the electrical lines via bonding wires are not required such that e.g. adapting the impedance of the network formed by the electrode arrangement, the terminating resistors and or the capacitive structure is facilitated. The possibility of precise impedance matching may be important in particular if this network forms part of an integral open collector circuitry as set forth above. Further, the monolithic design of the modulator may facilitate the integration of a plurality of modulators into a module.

However, the terminating resistors and/or the capacitive structure may also be formed as separate components arranged e.g. on a different substrate (e.g. a ceramic substrate) than the electrical lines of the electrode arrangement and/or coupled to the first and the second electrical line of the modulator, e.g. via bonding wires.

According to an embodiment of the invention, the first one of the conductive layers is connected to a first one of the terminating resistors and a second one of the conductive layers is connected to a second one of the terminating resistors. This configuration in particular allows the modulator to be part of an open collector circuit, wherein the two terminating resistors are coupled via a single capacitance formed by the conductive layers and the dielectric layer in between.

It is also possible that the capacitive structure comprises three electrically conductive layers and at least one dielectric layer to form two capacitors via which the first and the second terminating resistor is connected to ground, thereby forming a part of another open collector circuit as will be discussed in more detail below. More particularly, a first and a third one of the conductive layers are separated by the dielectric layer and a second one of the conductive layers and the third conductive layer are separated by the dielectric layer, and wherein the first conductive layer is connected to a first one of the terminating resistors, the second conductive layer is connected to a second one of terminating resistors, and wherein the third conductive layer is grounded.

The first and the second electrical line of the electrode arrangement may form a coplanar strip line. For example, the coplanar strip line is operated as a travelling wave electrode, e.g. of a Mach-Zehnder modulator. Further, the first and the second electrical line may be capacitively coupled to one another, i.e. a capacitor or a plurality of capacitors may be provided via which the first electrical line is coupled to the second electrical line. For example, the modulator according to the invention is a capacitively loaded Mach-Zehnder modulator, wherein the first and the second electrical line form the two planar lines of a travelling wave coplanar line.

An example of a possible principal optical and electrical layout of such a travelling wave Mach-Zehnder modulator is described in the publication "45 GHz Bandwidth Travelling Wave Electrode Mach-Zehnder Modulator with Integrated Spot Size Converter", D. Hoffmann, Proceedings International Conference on Indium Phosphide and Related Materials, p. 585, 2004, wherein the content of this article in respect to the principle optical and electrical design of the Mach-Zehnder modulator is incorporated by reference herewith. It is noted, however, that the invention is of course not restricted to a particular electrode design but could be also used in other electrical circuits or to form other electrical circuits. Further, the another possible design is described in international patent application WO 2012/175551 which in respect to the principle optical and electrical design of modulator is also incorporated by reference herewith.

It is noted that such a modulator may also be operated as a phase modulator, wherein only one of the two optical waveguides of the modulator is used to modulate the phase of an optical signal. For example, the one of the optical waveguides that is not used may be optically inactive, wherein, however, capacitive segments formed by the optically inactive waveguide are used for capacitively coupling of waveguide electrodes arranged on top of the optically active waveguide to the driver unit.

Moreover, in a first region of the electrode arrangement the first and the second electrical line may extend in a first distance from one another, wherein in a second region of the electrode arrangement the first and the second electrical line extend in a second distance from one another that is larger than the first distance, wherein the two terminating resistors are arranged between the first and the second electrical line in the second region of the electrode arrangement. The two terminating resistors in particular are arranged in a distance from the optical waveguides of the modulator (but e.g. symmetrically with respect to the optical waveguides) in order to reduce the thermal impact on the waveguides. The greater the required distance from the optical waveguides, the more the distance between the first and the second electrical has to be increased.

Furthermore, the capacitive structure may be used for adapting the impedance of the electrode arrangement. In particular, the conductive structure may influence the effective distance of the first and a second electrical line, i.e. the distance between the first and a second electrical line that determines the impedance of the electrode arrangement (e.g. forming a coplanar strip line as mentioned above). The capacitive structure may be arranged at least partially between the first and the second electrical line in a widened region of the electrode arrangement, i.e. in the second region of the electrode arrangement as set forth above.

For example, the geometry of the capacitive structure is chosen in such a way that the effective distance of the widened second region of the electrode arrangement and thus the impedance of the electrode arrangement (i.e. the impedance of the first and the second optical line) at least essentially equals the impedance of straight first and second electrical lines (e.g. a straight coplanar strip line), i.e. an electrode arrangement whose first and second electrical line are disposed in the first distance from one another over their entire length.

In particular, the first and a second electrical line may be driven symmetrically ("differential drive"), i.e. the driver unit may be configured for supplying a differential voltage signal to the flexible coplanar strip and thus to the coplanar strip line of the modulator. For example, none of the electrical lines of the electrode arrangement and/or of the flexible coplanar strip line is grounded. Accordingly, the first and the second electrical line may also be formed as geometrically symmetric structures. For example, the modulator according to the invention comprises two optical waveguides (see above), wherein the terminating resistors are arranged symmetrically with respect to the optical waveguides. Also, the electro-optical modulator according to the invention may comprise a driver unit supplying a differential voltage signal to the electrode arrangement. Examples of symmetrically driven electrodes are disclosed in the European patent applications EP 2 615 489 and EP 2 615 490 which in that respect are enclosed by reference herewith.

According to another embodiment of the invention, the driver unit is operated in open collector mode or in open collector mode with back termination. Similarly, the driver unit may be operated in open drain or in open drain mode with back termination (if the driver unit is a CMOS device).

It is noted that it is of course not necessary to use open collector circuitry. Rather, the driver unit may have an internal terminating resistance that equals the impedance of the electrode arrangement, wherein the impedance of the first and the second electrical line and other electrical components (such as the terminating resistor mentioned above) is matched to the internal terminating resistance of the driver unit.

Further, the driver unit may supply a differential voltage to the coplanar strip line of the modulator as also already mentioned above.

In another embodiment of the invention, the modulator comprises an additional capacitor having a larger capacitance than the capacitive structure, wherein the two terminating resistors are coupled to one another via the capacitive structure and the additional capacitor. For example, the capacitance (e.g. 10-80 pF, in particular 20-30 pF) of the capacitive structure realizes a short circuit for higher frequency components. The additional capacitor, however, permits the terminating resistors to be capacitively coupled also with respect to lower frequencies.

The modulator according to the invention may be realized using indium phosphide technology, i.e. components of the modulator such as the electrode arrangement and optical waveguides are arranged on an indium phosphide substrate. However, of course the modulator can be fabricating using other technologies, i.e. substrates and semiconductor layers based on other materials such as gallium arsenide or silicon.

BRIEF DESCRIPTION OF THE DRAWINGS

Embodiments of the invention are explained in more detail hereinafter with reference to the Drawings.

DETAILED DESCRIPTION

Figure 1A:
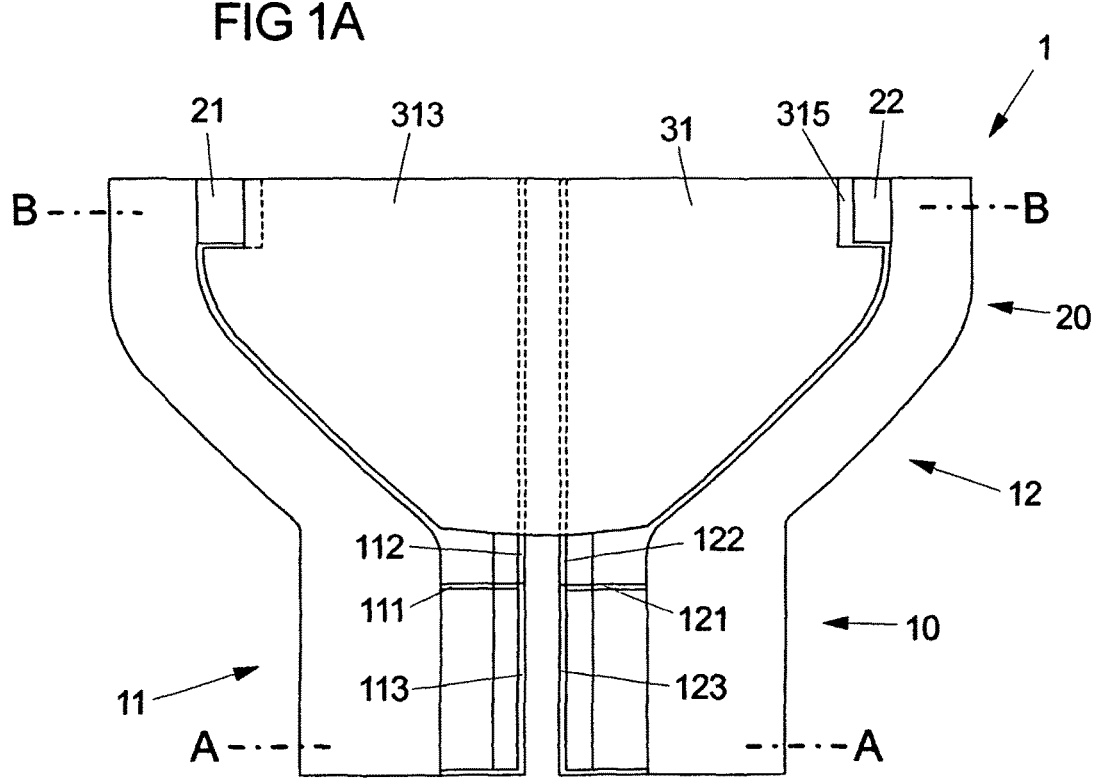
FIG. 1A show a top view of a detail of an electrode arrangement of an electro-optical modulator according to an embodiment of the invention.
Figure 1B:
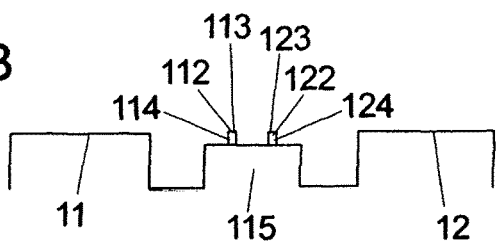
FIG. 1B shows a sectional view of the modulator shown in FIG. 1A along A-A.
Figure 1C:
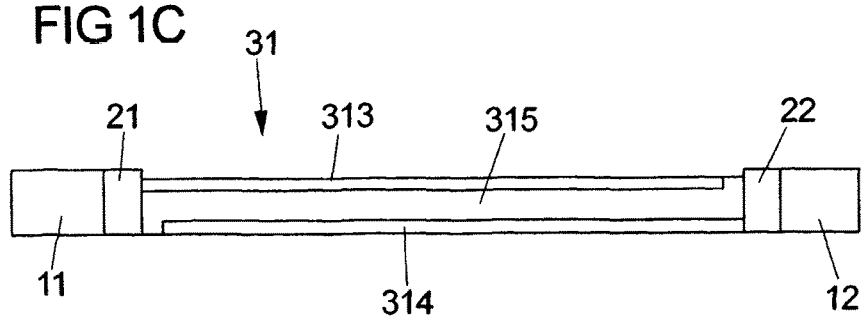
FIG. 1C shows a sectional view of the modulator shown in FIG. 1A through its capacitive structure (along line B-B in FIG. 1A).

FIGS. 1A to 1C illustrate a detail of an electrode arrangement 1 of an electro-optical travelling wave modulator according to an embodiment of the invention. The electrode arrangement 1 comprises a first and a second electrical line 11, 12 forming a coplanar strip line. The electrical lines 11, 12 are connected to waveguide electrodes 113, 123 via air bridges 111, 121 for applying a voltage across optical waveguides 112, 122 of the modulator as in principle known from the prior art. The first and the second waveguide electrodes 113, 123 are arranged on top of first and second capacitive segments 114, 124 of the optical wave guides 112, 122 such that the first and the second waveguide electrodes 113, 123 and thus the first and second electrical lines 11, 12 are capacitively coupled to one another.

In order to terminate the coplanar strip line two terminating resistors 21, 22 (each one having e.g. a resistance of 25Ω) are arranged between the electrical lines 11, 12, wherein the terminating resistors 21, 22 are formed as material layers arranged on a substrate together with the coplanar strip line, i.e. the terminating resistors 21, 22 are monolithically integrated with other components of the electro-optic modulator.

In order to permit the two terminating resistors 21, 22 to be arranged between the electrical lines 11, 12, the gap between the electrical lines 11, 12 widens towards the terminating resistors 21, 22 such that the electrode arrangement 1 comprises a first section 10 in which the electrical lines 11, 12 extend with a first distance from one another and a second region 20 in which the electrical lines 21, 22 extend with a second distance from one another, wherein the second distance is larger than the first distance. The second distance may be chosen to allow the terminating resistors 21, 22 to be arranged in such a way that thermal impact of the resistors 21, 22 on the optical wave guides 112, 122 are kept as low as possible. For example, the distance between the electrical lines 11, 12 in the second region 20 is at least 50 µm.

Further, a capacitive structure in the form of a metal structure 31 is arranged in the second region 20 of the electrode arrangement 1 between the electrical lines 11, 12 forming a capacitive structure that galvanically separates the two terminating resistors 21, 22.

More particularly, the metal structure 31 comprises two metal layers 313, 314 arranged one above the other (see FIG. 1C), wherein the metal layers 313, 314 (e.g. gold layers) are separated by a dielectric layer 315 (e.g. a silicon nitride or a silicon oxide layer) arranged between them. The upper metal layer 313 is electrically connected to the first terminating resistor 21, wherein the lower metal layer 314 is electrically connected to the second terminating resistor 22. Thus, the metal structure 31 provides a capacitor coupling the two terminating resistors 21, 22. In particular, the capacitive coupling between the two terminating resistors 21, 22 provided by the metal structure 31 can be used to realize an open collector circuit shown in FIG. 3.

Further, the metal structure 31 may be configured in such a way that the influence of the larger distance between the electrical lines 11, 12 in the second region 20 on the impedance of the coplanar strip line is compensated. In particular, the metal structure 31 reduces the effective distance between the first and the second electrical line 11, 12, which determines the impedance of the coplanar strip-line, such that a deteriorating effect of the increased distance between the electrical lines 11, 12 in the region of the terminating resistors 21, 22 may be counteracted.

In particular, the dimensions of the metal structure 31 are chosen in such a way that the impedance of the coplanar strip line formed by the electrical lines 11, 12 is adapted to the desired overall impedance of the coplanar line. In particular, the effective distance of the electrical lines 11, 12 from one another varies with the geometry of the metal structure 31 such that the metal structure 31 can be used to adapt the impedance of the coplanar strip line.

Figure 2:
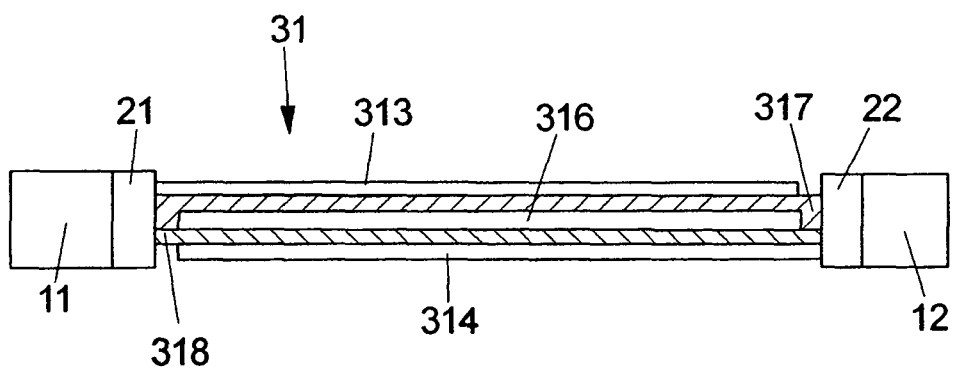
FIG. 2 schematically shows a sectional view of the capacitive structure of an electrode arrangement of an electro-optical modulator according to a second embodiment of the invention.

FIG. 2 illustrates a modification of the design of the metal structure 31, the metal structure according to this embodiment having three metal layers 313, 314 and 316. The first metal layer 313 is galvanically isolated from the third (middle) metal layer 316 by a first dielectric layer 317 and the second metal layer 314 is galvanically isolated from the third metal layer 316 by a second dielectric layer 318, thereby forming a first and a second capacitor. Instead of the two dielectric layers 317, 318 a single dielectric layer embedding the middle metal layer 316 could be arranged.

Figure 4:
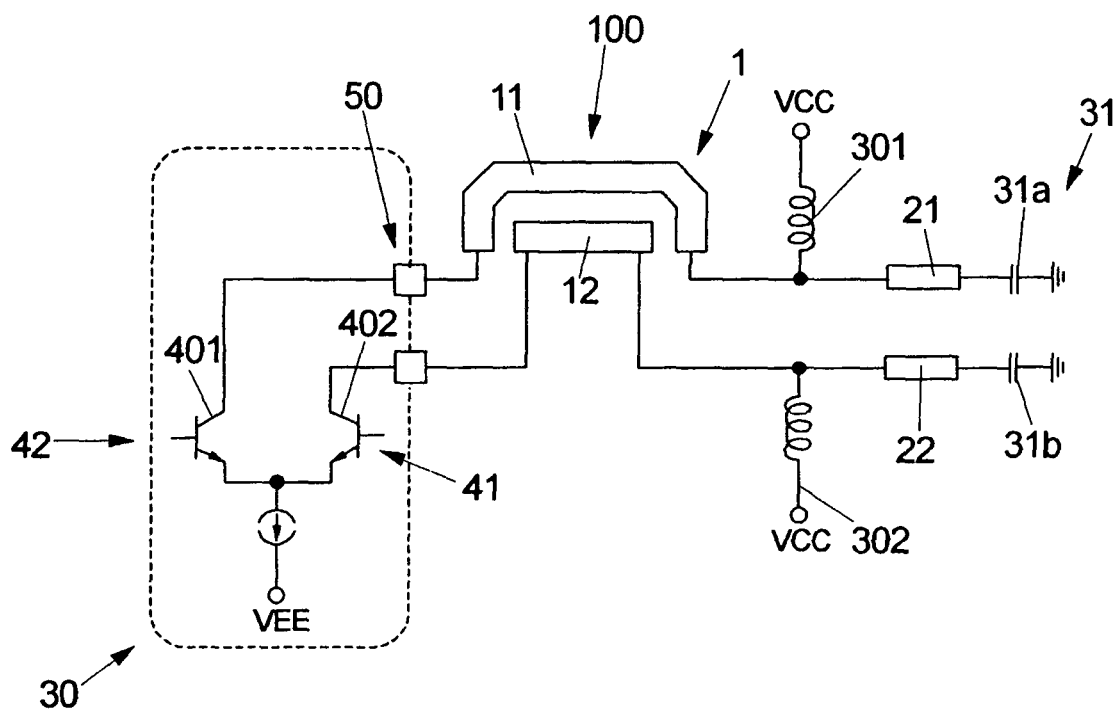
FIG. 4 depicts a circuit diagram of a second open collector circuit for driving the electrode arrangement of an electro-optic modulator according to the invention.

The middle metal layer 316 will be grounded, wherein the first, upper metal layer 313 is connected to the first terminating resistor 21 and the second, lower metal layer 314 is connected to the second terminating resistor 22 to realize the alternative open collector circuitry shown in FIG. 4. That is, the termination of the coplanar strip line is not realized by a single capacitor, but by two capacitors, wherein each one of the terminating resistors 21, 22 is connected to ground via one of the capacitors.

Figure 3:
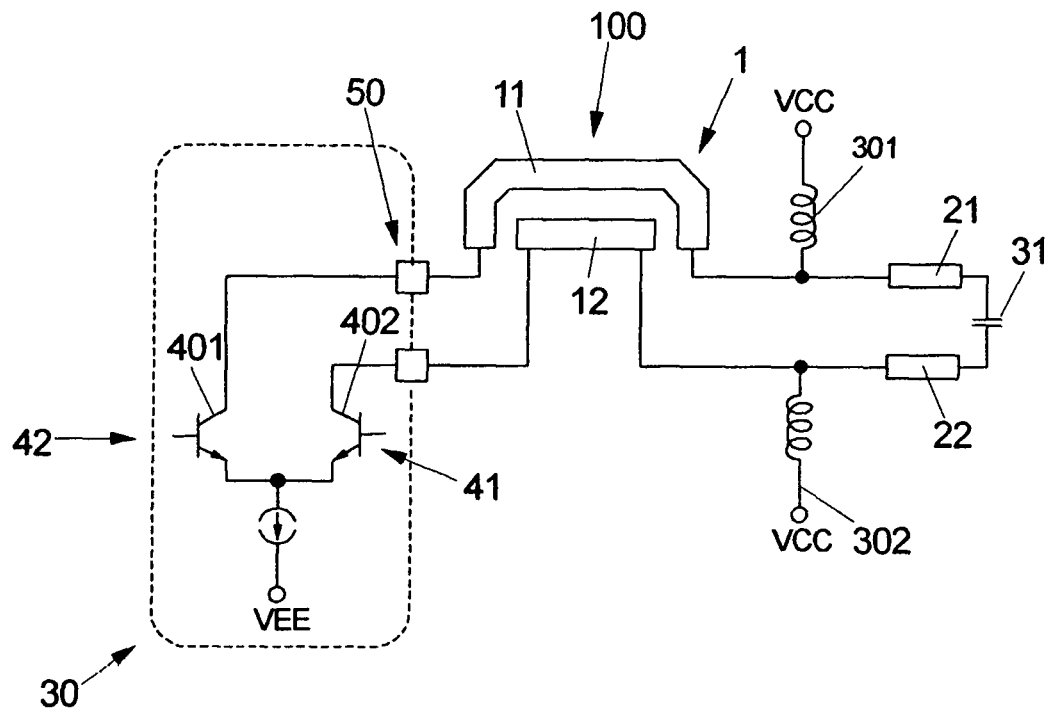
FIG. 3 depicts a circuit diagram of a first open collector circuit for driving the electrode arrangement of an electro-optic modulator according to the invention.

According to FIG. 3, a driver unit 30 is arranged to supply a differential voltage to the electrode arrangement 1 of the modulator, the electrode arrangement 1 comprising the two terminating resistors 21, 22 as illustrated in FIGS. 1A-C, the terminating resistors 21, 22 being capacitively coupled via the metal structure 31. Further, two inductances 301, 302 are connected to the terminating resistors 21, 22 via which a supply voltage $V_{CC}$ is fed towards the collectors 401, 402 of two transistors 40, 41 of the driver unit 30. Supplying $V_{CC}$ via the inductances 301, 302 has the advantage that the supply power is guided around the terminating resistors 21, 22 such that a power loss in the terminating resistors 21, 22 is avoided. According to another embodiment, the inductances 301, 302 are arranged between the driver unit 30 and the modulator 100.

Further, it is noted that the driver unit 30 may also be a CMOS device, wherein an open drain circuit may be realized (by supplying the voltage $V_{CC}$ to a drain of the driver unit's transistors).

As mentioned above, FIG. 4 relates to another open collector circuitry, wherein the termination of the coplanar strip line is realized by two terminating resistors 21, 22 and two capacitors formed by the metal structure 31, each one of the terminating resistors 21, 22 being connected to ground via one of the capacitors.

Figure 5:
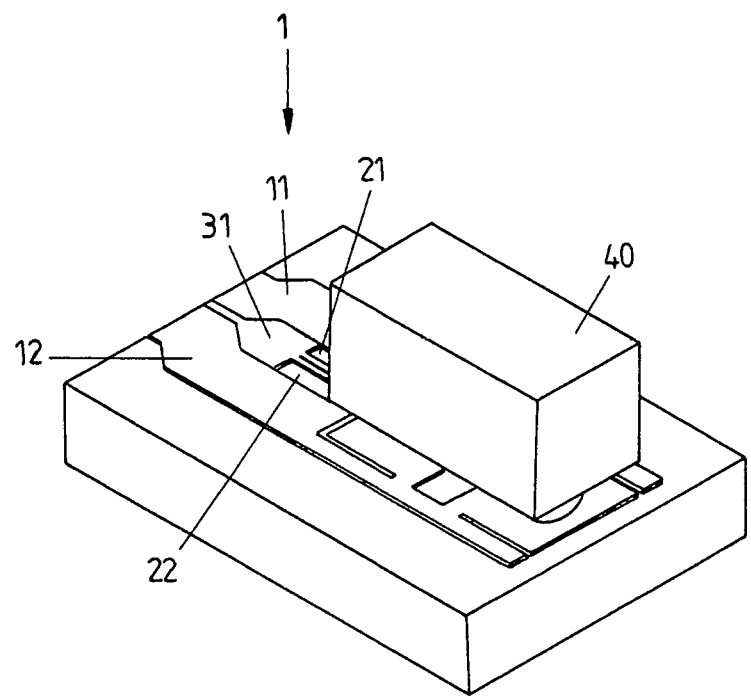
FIG. 5 depicts a perspective view of a detail of an electrode arrangement of an electro-optical modulator according to another embodiment of the invention.

The metal structure 31 may be designed to provide a capacitance between the terminating resistors 21, 22 that allows higher frequency signal components to pass. In order to provide a capacitive coupling of the terminating resistors 21, 22 also for lower frequency components at least one further (optional) capacitor 40 is arranged as depicted in FIG. 5. In particular, if the metal structure 31 is formed according to FIGS. 1A-C, i.e. the metal structure 31 forms a single capacitor, a single further capacitor may be provided, only. However, if the metal structure 31 is formed according to FIG. 2, at least two further capacitors may be provided, each capacitor being connected to one of the capacitor formed by the three metal layers 313, 314, 316.

The capacitor 40 has a capacitance that is larger than the capacitance provided by the metal structure 31 such that the terminating resistors 21, 22 may be capacitively coupled also with respect to lower frequencies. For example, the further capacitor 40 allows frequencies below 1 GHz to pass, while frequencies above 1 GHz will pass via the capacitor formed by the metal structure 31.

Figure 6:
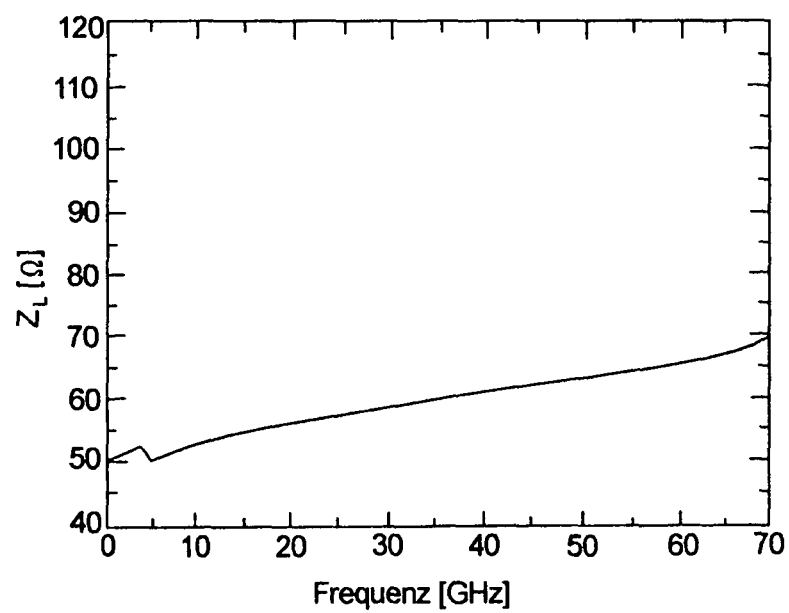
FIG. 6 represents the impedance of the electrode arrangement of the modulator of FIG. 5.

The (simulated) frequency behavior of the impedance $Z_L$ (impedance response) of the two capacitors 31 and 40 of the electrode arrangement 1 shown in FIG. 5 is illustrated in FIG. 6. The impedance response only slightly increases towards higher frequencies. The simulation further shows that the reflection (the S11-parameter) can be below −20 dB up to 40 GHz.

Figure 7:
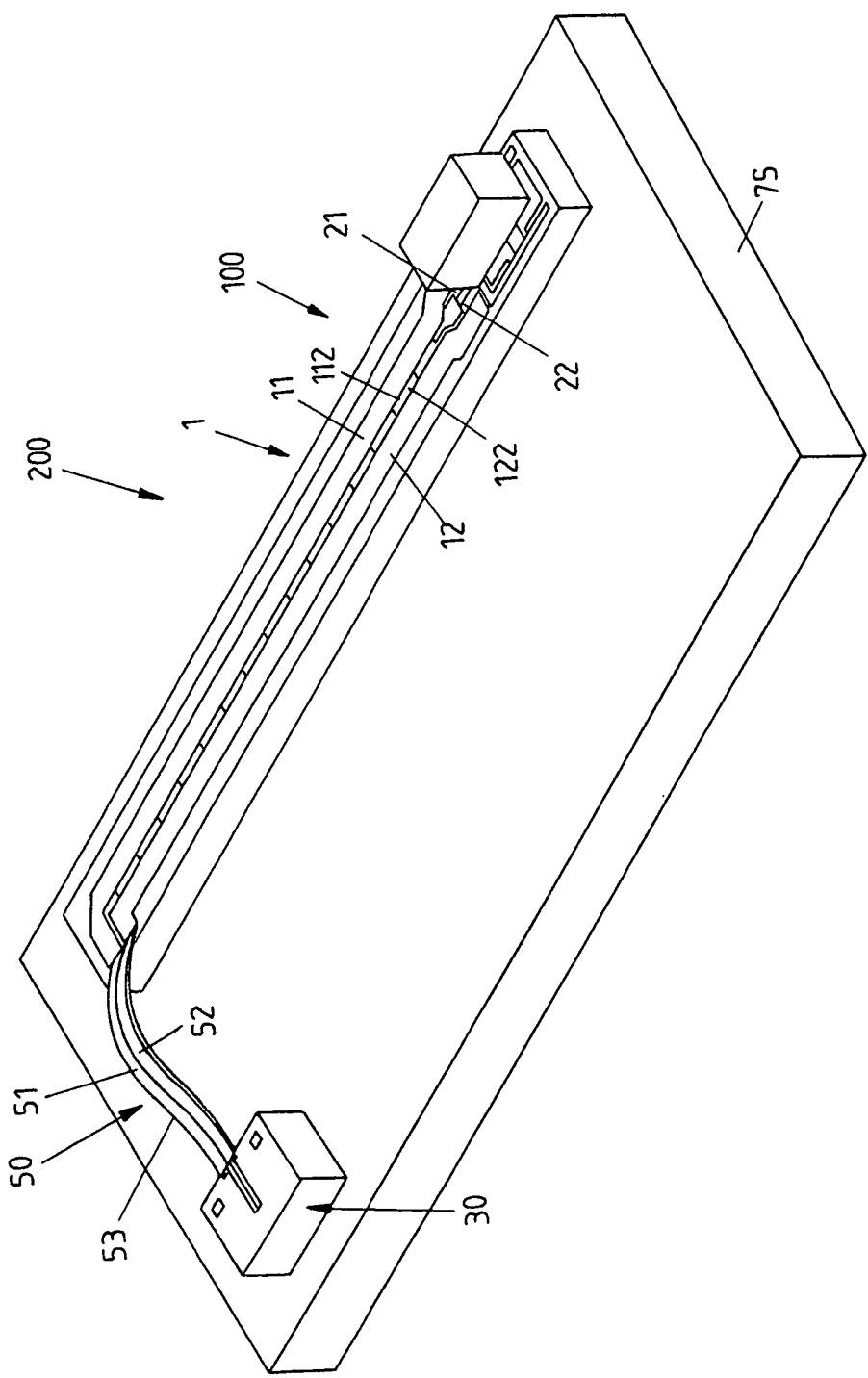
FIG. 7 shows the entire modulator of FIG. 5.

FIG. 7 illustrates a perspective view of an entire open-collector capable Mach-Zehnder-modulator device 200 comprising a modulator 100 according to the invention and a driver unit 30 configured to supply a (high frequency) differential voltage to the electrode arrangement 1 of modulator 100. The modulator 100 comprises the electrode arrangement 1 shown in FIG. 5, i.e. comprising a monolithically integrated terminating network comprising the terminating resistors 21, 22, the metal structure 31 and the additional capacitor 40.

However, it is noted again that the monolithic integration of the terminating resistors, the metal structure 31 and/or the additional capacitor 40 with the electrical lines 11, 12 is only optional. For example, at least one of the group of the terminating resistor 21, 22, the metal structure 31 and/or the additional capacitor 40 is formed as a separate part, e.g. arranged on another substrate (e.g. a ceramic substrate) than the electrical lines 11, 12 and e.g. bonded to the electrical lines 11, 12 via bonding wires.

The driver unit 30 (i.e. an output port of the driver unit 30) is electrically connected to the first and the second electrical line 11, 12 via a flexible coplanar line 50. The flexible coplanar line 50 comprises electrical lines 51, 52 arranged on a flexible, foil-like substrate 53 (e.g. formed from a polymer such as polyimide).

The distance between the two (parallel) electrical lines 51, 52 is chosen to be small enough that the electrical lines 51, 52 from an electrical waveguide for conveying a high frequency electrical wave. For example, the distance between the electrical lines 51, 52 is smaller than 100 μm or smaller than 50 μm.

First endings of the electrical lines 51, 52 of the flexible coplanar line 50 are connected to an output port of the driver unit, whereas second endings of the electrical lines 51, 52 are connected to endings of the first and second electrical line 11, 12 of the modulator 100. Since the flexible coplanar strip 50 provides an electrical waveguide, its impedance can be better matched with the impedance of the driver unit 30 and the electrode arrangement 1 of the modulator such that the high frequency performance of the modulator can be improved. Due to its waveguide properties, in turn, the flexible coplanar strip 50 in contrast to bonding wires does not have to be very short such that a good thermal separation between the driver unit 30 (that may warm up during operation) and the modulator 100 can be realized. For example, the driver unit 30 is arranged in a distance of at least 1 mm from the modulator 100.

REFERENCE SIGNS

1 electrode arrangement
3 metal layer
10 first region
11, 12 electrical line
20 second region
21, 22 terminating resistor
30 driver unit
31 metal structure
31a, 31b capacitor
40 further capacitor
41, 42 transistor
50 flexible coplanar strip line
51, 52 electrical line
53 substrate
100 modulator
111, 121 air bridge
112, 122 optical waveguide
113, 123 waveguide electrode
114, 124 capacitive segment
200 modulator device
311 base portion
312 longitudinal portion
313, 314, 316 metal layer
317, 318 dielectric layer
401, 402 collector

The invention claimed is:

1. An electro-optical modulator, comprising:
   at least one optical waveguide;
   an electrode arrangement for applying a voltage across the optical waveguide,
   wherein the electrode arrangement comprises a first and a second electrical line and at least two terminating resistors terminating the first and the second electrical line,
   wherein the electrode arrangement comprises at least one capacitive structure that capacitively couples, but galvanically separates the two terminating resistors,
   wherein the capacitive structure comprises at least two electrically conductive layers physically arranged at a position between the first and the second electrical line,
   wherein the at least two layers are separated by at least one dielectric layer, and
   wherein the at least two electrically conductive layers of the capacitive structure are at least partially are arranged one above the other.

2. The electro-optical modulator as claimed in claim 1, wherein the capacitive structure and the electrical lines are arranged on a common substrate.

3. The electro-optical modulator as claimed in claim 1, wherein terminating resistors and the electrical lines are arranged on a common substrate.

4. The electro-optical modulator as claimed in claim 1, wherein a first one of the conductive layers is connected to a first one of the terminating resistors and a second one of the conductive layers is connected to a second one of the terminating resistors.

5. The electro-optical modulator as claimed in claim 1, wherein the capacitive structure comprises three electrically conductive layers and at least one dielectric layer, wherein a first and a third one of the conductive layers are separated by the dielectric layer and a second one of the conductive layers and the third conductive layer are separated by the dielectric layer, and wherein the first conductive layer is connected to a first one is connected to a second one is grounded.

6. The electro-optical modulator as claimed in claim 1, wherein the first and the second electrical line form a coplanar strip line.

7. The electro-optical modulator as claimed in claim 1, wherein the first and the second electrical line are capacitively coupled to one another.

8. The electro-optical modulator as claimed in claim 1, wherein in a first region of the electrode arrangement the first and the second electrical line extend in a first distance from one another and wherein in a second region of the electrode arrangement the first and the second electrical line extend in a second distance from one another that is larger than the first distance, wherein the two terminating resistors are arranged between the first and the second electrical line in the second region of the electrode arrangement.

9. The electro-optical modulator as claimed in claim 8, wherein the capacitive structure is arranged at least partially between the first and the second electrical line in the second region of the electrode arrangement.

10. The electro-optical modulator as claimed in claim 1, wherein two optical waveguides are provided, and wherein the terminating resistors are arranged symmetrically with respect to the optical waveguides.

11. The electro-optical modulator as claimed in claim 1, wherein the first and the second electrical line are formed as geometrically symmetric structures.

12. The electro-optical modulator as claimed in claim 1, further comprising at least one an additional capacitor having a larger capacitance than the capacitive structure, wherein the two terminating resistors are coupled to one another via the capacitive structure and the additional capacitor.

13. The electro-optical as claimed in claim 1, wherein the electrode arrangement has a travelling wave electrode design.

14. An electro-optical modulator device comprising a modulator as claimed in claim 1 and a driver unit supplying a differential voltage signal to the electrode arrangement.

15. The electro-optical modulator device as claimed in claim 14, wherein the driver unit is operated in open collector mode, in open collector mode with back termination, in open drain mode or in open drain mode with back termination.

* * * * *